United States Patent
Lei et al.

(10) Patent No.: US 11,181,956 B2
(45) Date of Patent: Nov. 23, 2021

(54) CONTROLLING FAN SPEED OF SERVER

(71) Applicant: New H3C Information Technologies Co., Ltd., Zhejiang (CN)

(72) Inventors: Mingchun Lei, Beijing (CN); Huanjun Zhang, Beijing (CN); Libo Chen, Beijing (CN); Bo Zhang, Beijing (CN)

(73) Assignee: New H3C Information Technologies Co., Ltd., Zhejiang (CN)

( * ) Notice: Subject to any disclaimer, the term of this patent is extended or adjusted under 35 U.S.C. 154(b) by 65 days.

(21) Appl. No.: 16/643,489

(22) PCT Filed: Aug. 29, 2018

(86) PCT No.: PCT/CN2018/102841
§ 371 (c)(1),
(2) Date: Feb. 28, 2020

(87) PCT Pub. No.: WO2019/042304
PCT Pub. Date: Mar. 7, 2019

(65) Prior Publication Data
US 2020/0192444 A1    Jun. 18, 2020

(30) Foreign Application Priority Data
Aug. 30, 2017   (CN) .......................... 201710763478.3

(51) Int. Cl.
*G06F 1/20*    (2006.01)
*G06F 1/28*    (2006.01)
*G06F 11/30*   (2006.01)

(52) U.S. Cl.
CPC ................ *G06F 1/206* (2013.01); *G06F 1/28* (2013.01); *G06F 11/3058* (2013.01)

(58) Field of Classification Search
CPC ..................................... G06F 1/206; G06F 1/28
See application file for complete search history.

(56) References Cited

U.S. PATENT DOCUMENTS

2003/0226364 A1* 12/2003 Swift ...................... F25B 9/145
                                                                  62/6
2004/0202534 A1   10/2004 Inoue et al.
(Continued)

FOREIGN PATENT DOCUMENTS

CN       102767530 A    11/2012
CN       103890405 A     6/2014
(Continued)

OTHER PUBLICATIONS

Japanese Patent Office, Office Action Issued in Application No. 2020-512605, dated Dec. 22, 2020, 5 pages. (Submitted with Machine Translation).

(Continued)

*Primary Examiner* — Mark A Connolly
(74) *Attorney, Agent, or Firm* — McCoy Russell LLP

(57) ABSTRACT

A method and a device for controlling a fan speed provided and may be applied to a server. According to an example of the method, a target DTS temperature curve corresponding to a current ambient temperature of the server is determined, and then, a DTS temperature corresponding to a current load of a power consumption component in the server is determined according to the target DTS temperature curve, and a speed of a fan associated with the power consumption component is adjusted according to the DTS temperature and a current temperature of the power consumption. The power consumption of the power consumption component and the power consumption of the fan are effectively balances by dynamically controlling the fan speed under different loads and at different ambient temperatures, thereby minimizing the power consumption of the server.

20 Claims, 5 Drawing Sheets

(56) References Cited

U.S. PATENT DOCUMENTS

| | | | |
|---|---|---|---|
| 2007/0162160 A1* | 7/2007 | Chang | G06F 1/206 |
| | | | 700/25 |
| 2009/0296342 A1 | 12/2009 | Matteson et al. | |
| 2012/0323400 A1 | 12/2012 | Sankar et al. | |
| 2013/0226364 A1 | 8/2013 | Artman et al. | |
| 2016/0146678 A1* | 5/2016 | Kalyanasundaram | |
| | | | G01K 13/02 |
| | | | 374/152 |
| 2017/0099748 A1 | 4/2017 | Kano | |

FOREIGN PATENT DOCUMENTS

| | | |
|---|---|---|
| CN | 104514742 A | 4/2015 |
| CN | 104571439 A | 4/2015 |
| CN | 104612993 A | 5/2015 |
| CN | 104675737 A | 6/2015 |
| CN | 106704234 A | 5/2017 |
| WO | 2016151779 A1 | 9/2016 |

OTHER PUBLICATIONS

ISA State Intellectual Property Office of the People's Republic of China, Written Opinion of the International Searching Authority Issued in Application No. PCT/CN2018/102841, dated Nov. 19, 2018, WIPO, 9 pages.
European Patent Office, Extended European Search Report Issued in Application No. 18850219.9, dated Jul. 1, 2020, Germany, 6 pages.
ISA State Intellectual Property Office of the People's Republic of China, International Search Report Issued in Application No. PCT/CN2018/102841, dated Nov. 19, 2018, WIPO, 4 pages.
State Intellectual Property Office of the People's Republic of China, Office Action and Search Report Issued in Application No. 201710763478.3, dated May 29, 2019, 9 pages. (Submitted with Partial Translation).

* cited by examiner

CONTROLLING FAN SPEED OF SERVER

CROSS-REFERENCE TO RELATED APPLICATIONS

The present application is a U.S. National Phase of International Patent Application Serial No. PCT/CN2018/102841 entitled "FAN SPEED CONTROL FOR SERVER," filed on Aug. 29, 2018. International Patent Application Serial No. PCT/2018/102841 claims priority to Chinese Patent Application No. 201710763478.3, filed on Aug. 30, 2017. The entire contents of each of the above-cited applications are hereby incorporated herein by reference in their entirety for all purposes.

BACKGROUND AND SUMMARY

A cost of a server may include a purchase cost and an operation and maintenance cost. The operation and maintenance cost may mainly include a power cost (also called power consumption) required for operating a server, a cost of environmental control of a server room and the like. The operation and maintenance cost of a server is an important consideration for a customer to purchase a server.

BRIEF DESCRIPTION OF THE DRAWINGS

Accompanying drawings herein incorporated in the specification to constitute a part of the present description, illustrate examples consistent with the present disclosure, and serve to explain the principles of the present disclosure together with the description.

DETAILED DESCRIPTION OF THE EMBODIMENTS

Figure 1:
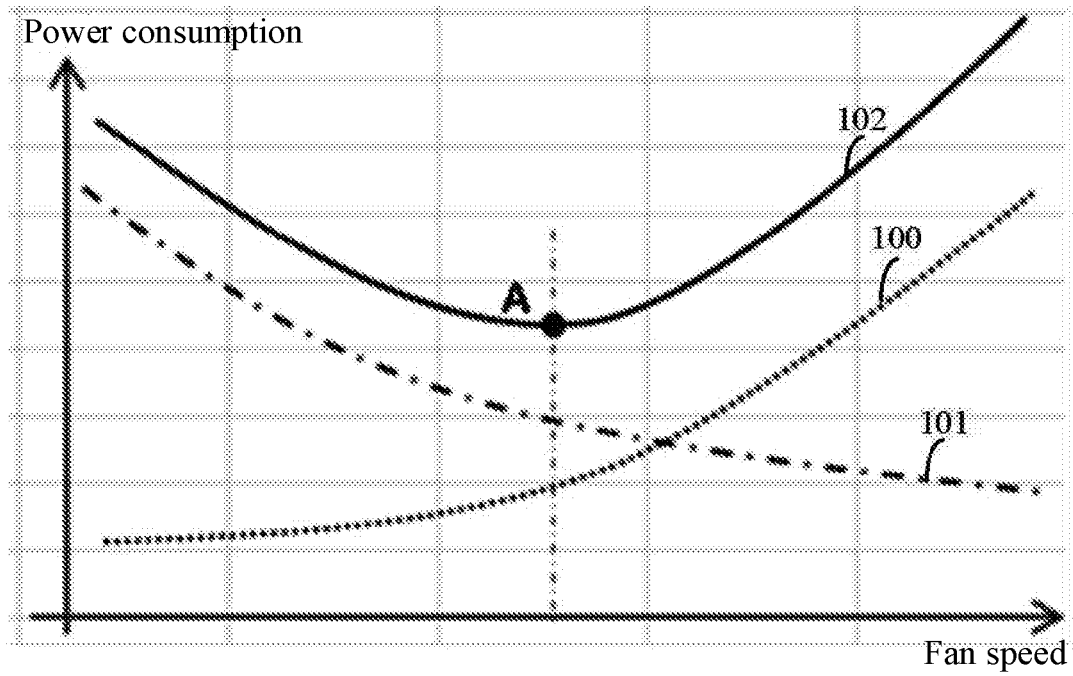
FIG. 1 is a schematic curve illustrating a relationship between fan speed and server power consumption according to an example of the present disclosure.

In operation and maintenance cost of a server, the biggest part is a power cost required for operating the server. It is found through tests that a speed of a fan for dissipating heat in a server is an important parameter affecting the power cost. The lower the fan speed is, the lower the power consumption of the fan is and the lower the power cost is. Otherwise, the higher the fan speed is, the higher the power consumption of the fan is and the higher the power cost is. Therefore, properly adjusting the speed of the fan in the server becomes an important approach to reduce the operation and maintenance cost of the server. The proper adjustment to the fan speed of the server herein does not mean that the fan speed can be lowered blindly because temperature of hardware in the server may increase due to excessively low fan speed, resulting in increase in power consumption of the server as well as higher risk of burn-out of the hardware. Therefore, it is desired to reduce the fan speed as possible based on actual conditions without affecting operation of hardware so as to reduce the operation and maintenance cost.

A common method of controlling a fan speed is as follows: a Baseboard Management Controller (BMC) of a server may periodically collect a temperature value of each temperature sensor on the server, obtain an operation result by performing a specified operation, for example, an average value operation, for the collected temperature values of each of the temperature sensors, retrieve a fan speed corresponding to the operation result on a pre-stored fan speed-temperature curve, and control the fan in the server to operate according to the obtained fan speed. The fan speed-temperature curve is a predetermined and fixed curve satisfying an energy-saving requirement that when the temperature of the server is low, the fan speed is low and the power consumption of the fan is low.

Since the fan speed-temperature curve is fixed, a fan speed determined from the curve cannot be optimal in all cases. For example, in a case where an ambient temperature is 20 degrees, the curve may be optimal. However, in other cases, for example, where an ambient temperature is 15 degrees, 10 degrees, 25 degrees or the like, the curve may not be optimal. Therefore, the energy saving purpose may not be achieved by adjusting the fan speed based on the curve in all cases.

Based on this, an example of the present disclosure provides a method of controlling a fan speed to prevent occurrence of the above problem caused by adjusting the fan speed based on the fixed fan speed-temperature curve. A Digital Thermal Sensor (DTS) temperature curve involved in the present disclosure is firstly described before the method of the present disclosure is described.

Power consumption of a server includes power consumption of main component of the server, and the main component may be referred to as power consumption component. In an example, a Central Processing Unit (CPU) in an ordinary server such as a commonly used X86 server may be the above power consumption component since it generates the largest power consumption in the ordinary server; a Graphic Processing Unit (GPU) in a non-ordinary server such as a GPU type server may be the above power consumption component since it generates the largest power consumption in the non-ordinary server; a Hard Disk Drive (HDD) in a HDD type server may be the above power consumption component since it generates the largest power consumption in the HDD type server.

It is found through tests that a relationship between server power consumption and a fan speed is mainly affected by three factors, that is, an ambient temperature of a server, a load of a power consumption component and an optimal DTS temperature.

When the fan speed is increased, the power consumption of the fan increases as shown in a curve 100 in FIG. 1. Since the fan speed is increased, the temperature of the power consumption component is lowered, and the power consumption of the power consumption component is reduced as shown in a curve 101 in FIG. 1. A sum of the power consumption of the fan and the power consumption of the power consumption component is the power consumption of the whole server, and the power consumption of the server may change along with the fan speed as shown in a curve 102 in FIG. 1.

Since the power consumption of the server at a point A in the curve 102 shown in FIG. 1 is the minimum, the point A may be referred to as an optimal power consumption point.

The above optimal power consumption point is obtained on the precondition that the server is at a specific ambient temperature and the power consumption component carries a specific load. Thus, a different optimal power consumption point may be obtained when the server is at a different ambient temperature and the power consumption component carries a different load. A curve formed by all optimal power consumption points obtained at different ambient temperatures with the power consumption component under different loads is a DTS temperature curve that is obviously different from a curve in which only one fixed ambient temperature is involved. Thus, the DTS temperature curve of the present disclosure may also be referred to as an optimal DTS temperature curve. The DTS temperature curve of the present disclosure will be described below by way of examples.

Figure 2:
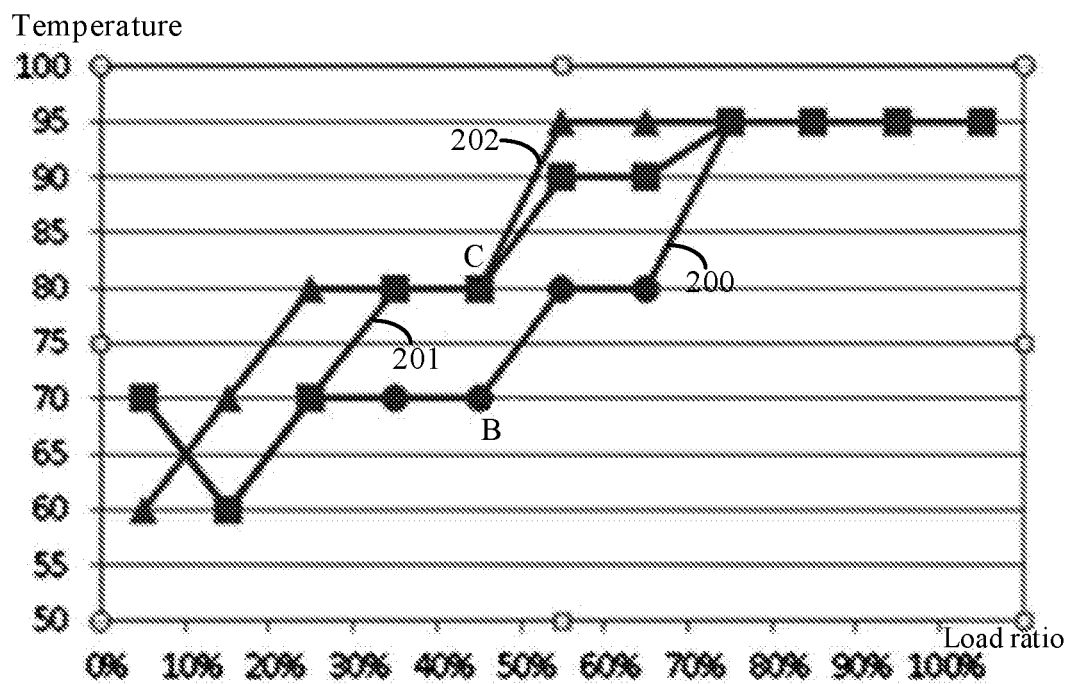
FIG. 2 is a temperature curve illustrating an optimal DTS according to an example of the present disclosure.

For a server including a CPU as a power consumption component, FIG. 2 illustrates three DTS temperature curves 200-202. In FIG. 2, an abscissa refers to load ratio of the CPU, and an ordinate refers to temperature of the CPU which may also be referred as CPU temperature. In the ordinate, 100 degrees is a preset shutdown temperature of the CPU, which means the temperature of the CPU cannot exceed 100 degrees, and the CPU will be automatically shut down when the temperature reaches 100 degrees.

As shown in FIG. 2, the curve 200 indicates a DTS temperature curve when an ambient temperature of the server is 20 degrees and the CPU carries different loads; the curve 201 indicates a DTS temperature curve when the ambient temperature of the server is 25 degrees and the CPU carries different loads; the curve 202 indicates a DTS temperature curve when the ambient temperature of the server is 30 degrees and the CPU carries different loads. A point B in the curve 200 shown in FIG. 2 is taken as an example. When the ambient temperature of the server is 20 degrees and the load ratio of the CPU is 40%, the power consumption of the server may be minimized by controlling the temperature of the CPU to be 70 degrees. The meaning of other points in the curve 200 and each point in the curve 201 and the curve 202 are similar to that of the point B.

It may be seen from the curve 200 to the curve 202 shown in FIG. 2 that the lower the ambient temperature of the server is, the lower the corresponding DTS temperature is. The DTS temperature indicates a difference between a temperature of the CPU on the DTS temperature curve and the shutdown temperature of the CPU. Descriptions are made below with the point B in the curve 200 and the point C in the curve 201 in FIG. 2 as an example. The point B in the curve 200 indicates that the DTS temperature is −30 degrees when the ambient temperature of the server is 20 degrees and the load ratio of the CPU is 40%. The point C in the curve 201 indicates that the DTS temperature is −20 degrees when the ambient temperature of the server is 25 degrees and the load ratio of the CPU is 40%. Therefore, it is verified that, when the load ratio of the power consumption component is the same, the DTS temperature is lower when the ambient temperature of the server is lower.

The DTS temperature curve is described above, and a method of the present disclosure will be described below.

Figure 3:
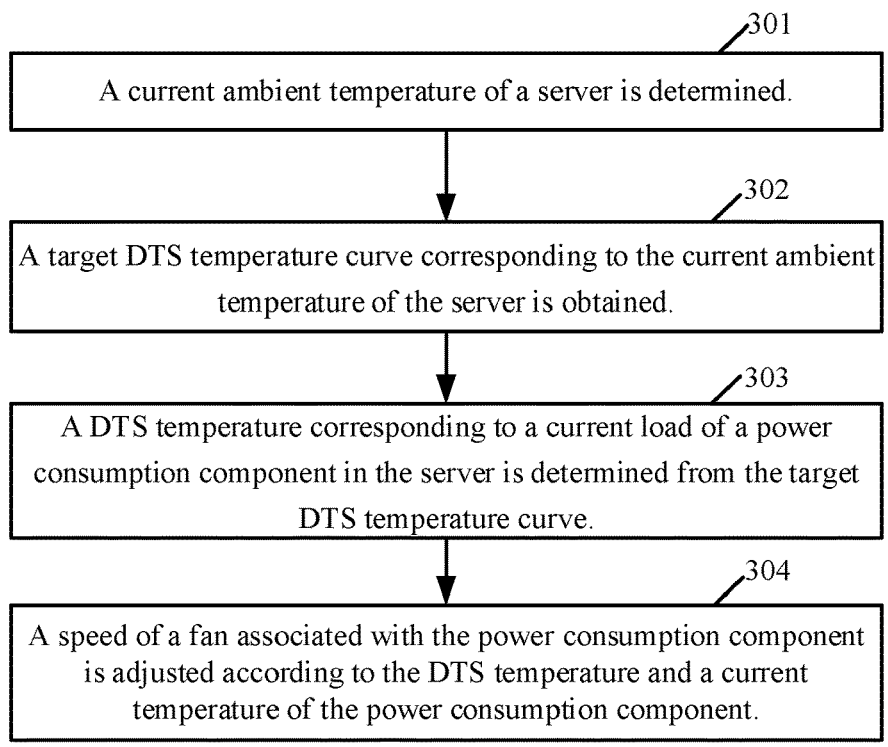
FIG. 3 is a schematic flowchart illustrating a method of controlling a fan speed according to an example of the present disclosure.

FIG. 3 is a flowchart illustrating a method according to an example of the present disclosure. As shown in FIG. 3, the flow may be applied to a server and may include the following blocks.

Block 301: a current ambient temperature of a server is determined.

In an example, the current ambient temperature of the server may be determined in a manner as follows: a temperature collected by a temperature sensor provided at an air inlet of a server is obtained and then determined as the current ambient temperature of the server.

Block 302: a target DTS temperature curve corresponding to the current ambient temperature of the server is obtained.

When a server is developed, some specified temperatures may be determined at an interval of T degrees according to an ambient temperature specification of the server. For example, when the ambient temperature specification of the server is 10 to 100 degrees and T is 5, specified temperatures including 10 degrees, 15 degrees, 20 degrees, 25 degrees, 30 degrees and the like may be determined at an interval of 5 degrees. For each of the specified temperatures, a DTS temperature curve may be acquired by testing with different load ratios of the power consumption component in the server, and thus DTS temperature curves corresponding to different ambient temperatures, for example, the curve 200 to the curve 202 shown in FIG. 2, may be obtained. Then, all of the DTS temperature curves obtained through the tests are stored in a BMC of the server, or in a specified storage device.

In this way, a target DTS temperature curve corresponding to the current ambient temperature of the server may be determined from a plurality of stored DTS temperature curves according to the current ambient temperature of the server. In the present disclosure, block 302 may be implemented in many manners. Two examples are described below in combination with flows shown in FIG. 4 and FIG. 5 respectively.

Block 303: a DTS temperature corresponding to a current load of a power consumption component in the server is determined in the obtained target DTS temperature curve.

In the present disclosure, the DTS temperature corresponding to the current load of the power consumption component may be determined from the target DTS temperature curve in many manners. Two examples are described below in combination with flows shown in FIG. 6 and FIG. 7 respectively.

Block 304: a speed of a fan associated with the power consumption component is adjusted according to the DTS temperature and a current temperature of the power consumption component.

In the method of the present disclosure, the fan speed may be adjusted based on not only the current temperature of the power consumption component but also the current ambient temperature of the server and the DTS temperature corresponding to the current load of the power consumption component. Therefore, almost all factors possibly affecting the fan speed are considered, thereby widening an application range.

A fan associated with the power consumption component at block 304 may include a fan directly opposite to the power consumption component or positioned at a specified angle with respect to the power consumption component. The specified angle is set according to whether wind generated by the fan can reach and affect the power consumption component or not. Other fans unassociated with the power consumption component may be controlled based on an existing fan energy-saving scheme.

Figure 8:
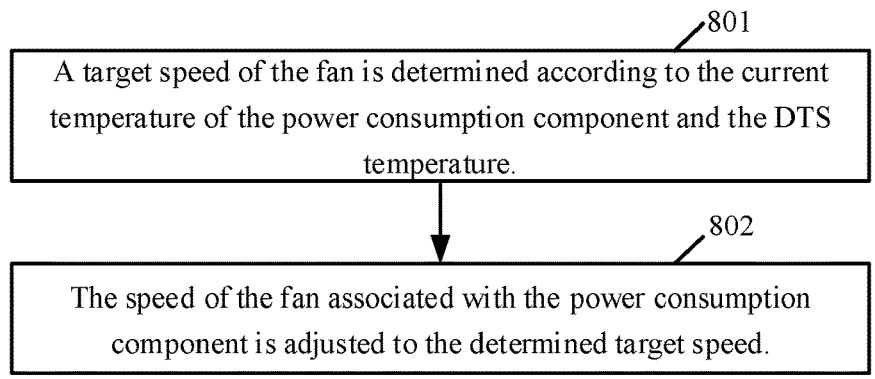
FIG. 8 is a schematic flowchart illustrating determining a speed of a fan associated with a power consumption component according to an example of the present disclosure.

In the present disclosure, adjusting the speed of the fan associated with the power consumption component according to the DTS temperature and the current temperature of the power consumption component may be implemented in many manners. FIG. 8 illustrates one of the implementations.

Thus, the flow shown in FIG. 3 is completed.

It may be seen from the flow shown in FIG. 3 that, in the present disclosure, the entire power consumption of the server may be minimized by performing dynamic adjustment to the fan speed based on the current temperature of the power consumption component and the DTS temperature obtained based on the current ambient temperature of the server and the current load of the power consumption component, thus effectively reducing the operation and maintenance cost of the server.

Figure 4:
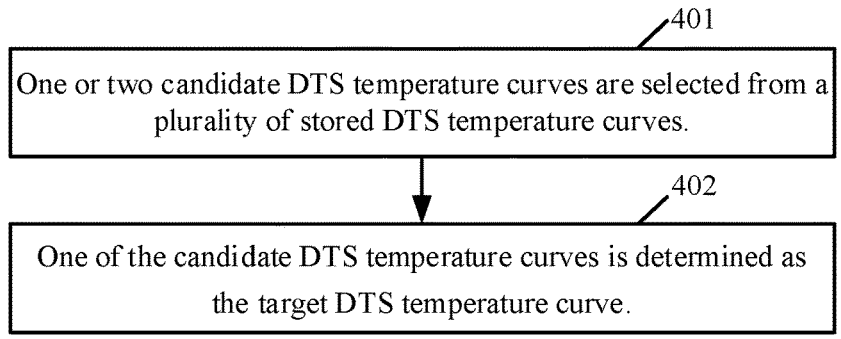
FIG. 4 is a schematic flowchart illustrating obtaining a target DTS temperature curve corresponding to an ambient temperature according to an example of the present disclosure.

FIG. 4 is a flowchart illustrating an implementation of block 302 according to an example of the present disclosure. As shown in FIG. 4, the flow may include blocks as follows.

Block 401: one or two candidate DTS temperature curves are selected from a plurality of stored DTS temperature curves.

Each of the candidate DTS temperature curves corresponds to an ambient temperature which is closest to the current ambient temperature of the server. It shall be noted that, in the plurality of stored DTS temperature curves, there may be two DTS temperature curves corresponding to ambient temperatures which are closest to the current ambient temperature of the server. For example, the current ambient temperature of the server is 10 degrees, and one DTS temperature curve in the stored DTS temperature curves corresponds to an ambient temperature of 15 degrees and another DTS temperature curve in the stored DTS temperature curves corresponds to an ambient temperature of 5 degrees. In this case, since the current ambient temperature of the server is 10 degrees and is exactly a median value of the ambient temperatures 5 degrees and 15 degrees, the DTS temperature curve corresponding to the ambient temperature of 5 degrees and the DTS temperature curve corresponding to the ambient temperature of 15 degrees are both candidate DTS temperature curves, and any one of the two curves may be determined as a target DTS temperature curve.

Block 402: one of the obtained candidate DTS temperature curves is determined as a target DTS temperature curve corresponding to the current ambient temperature of the server.

Thus, the flow shown in FIG. 4 is completed. The target DTS temperature curve corresponding to the current ambient temperature of the server may be determined from the stored DTS temperature curves through the flow shown in FIG. 4.

Figure 5:
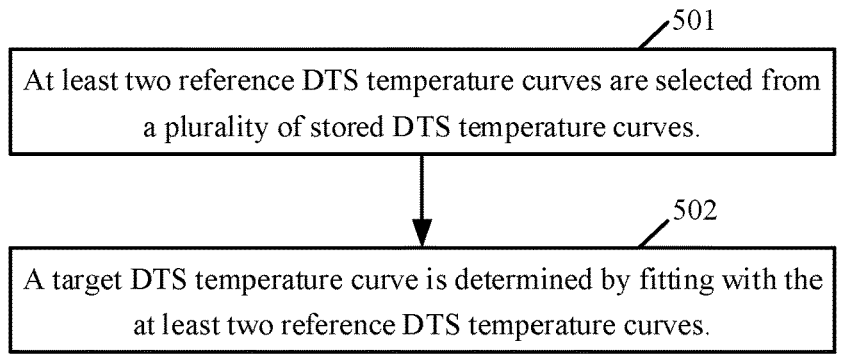
FIG. 5 is a schematic flowchart illustrating obtaining a target DTS temperature curve corresponding to an ambient temperature according to another example of the present disclosure.

FIG. 5 is a flowchart illustrating an implementation of block 302 according to another example of the present disclosure. As shown in FIG. 5, the flow may include blocks as follows.

Block 501: at least two reference DTS temperature curves are selected from a plurality of stored DTS temperature curves.

Each of the selected reference DTS temperature curves corresponds to an ambient temperature which is close to the current ambient temperature of the server. For convenience of description, for example, two reference DTS temperature curves are selected and the two reference DTS temperature curves are denoted as a curve 51 and a curve 52, respectively.

In an example, the curve 51 corresponds to an ambient temperature which is exactly equal to the current ambient temperature of the server, and the curve 52 corresponds to an ambient temperature which has a smallest non-zero difference absolute value with respect to the current ambient temperature of the server. For example, the curve 52 may correspond to an ambient temperature which is either greater or smaller than the current ambient temperature of the server, but is closest to the current ambient temperature of the server among all ambient temperatures corresponding to all the DTS temperature curves.

In another example, the ambient temperature corresponding to the curve 51 is the smallest in all those ambient temperatures that correspond to the DTS temperature curves and are greater than the current ambient temperature of the server; the ambient temperature corresponding to the curve 52 is the biggest in all those ambient temperatures that correspond to the DTS temperature curves and are smaller than the current ambient temperature of the server. For example, the curve 51 and the curve 52 correspond to two ambient temperatures which are two adjacent specified temperatures, and the current ambient temperature of the server is between the two specified temperatures.

Block 502: a target DTS temperature curve corresponding to the ambient temperature of the server is obtained by fitting with the selected at least two reference DTS temperature curves.

In the present disclosure, the at least two reference DTS temperature curves may be fitted in any data fitting manner well known to those of ordinary skill in the art, which will not be described herein.

Thus, the flow shown in FIG. 5 is completed. The target DTS temperature curve corresponding to the current ambient temperature of the server may be obtained from the stored DTS temperature curves through the flow shown in FIG. 5.

Figure 6:
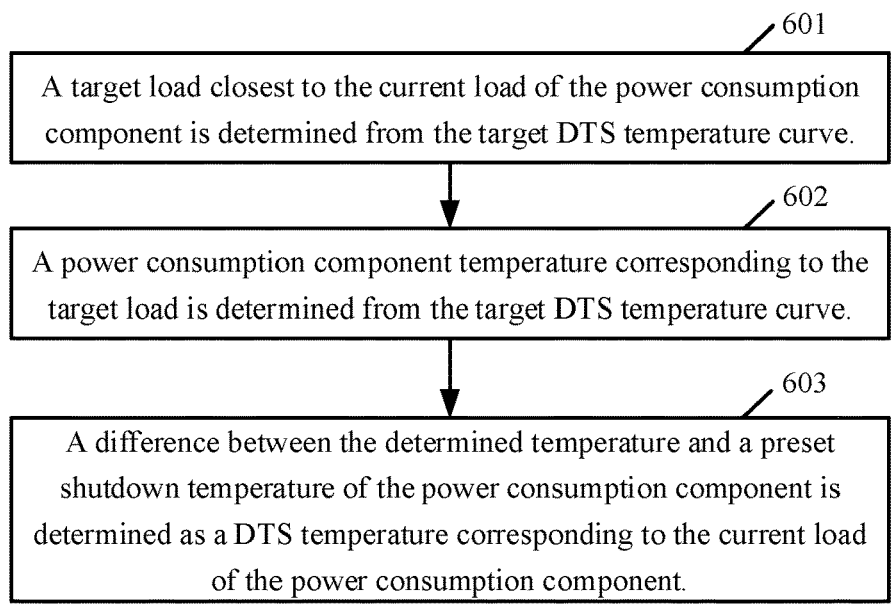
FIG. 6 is a schematic flowchart illustrating determining a DTS temperature corresponding to a current load of a power consumption component according to an example of the present disclosure.

FIG. 6 is a flowchart illustrating an implementation of block 303 according to an example of the present disclosure. As shown in FIG. 6, the flow may include the following blocks.

Block 601: a target load closest to the current load of the power consumption component is determined from the target DTS temperature curve corresponding to the current ambient temperature of the server.

As described above, the DTS temperature curve indicates a relationship between the load of the power consumption component and the temperature of the power consumption component. An abscissa refers to the load of the power consumption component, and an ordinate refers to the temperature of the power consumption component which may also be referred to as power consumption component temperature. Based on this, at block 601, the load closest to the current load of the power consumption component may be easily acquired from the target DTS temperature curve corresponding to the current ambient temperature of the server. If two loads closest to the current load of the power consumption component are determined, for example, one load is greater than the current load of the power consumption component and the other load is smaller than the current load of the power consumption component, any one of the two loads may be selected.

Block 602: a power consumption component temperature corresponding to the determined target load is obtained from the target DTS temperature curve corresponding to the current ambient temperature of the server.

As described above, the DTS temperature curve indicates a corresponding relationship between the load of the power consumption component and the temperature of the power consumption component. An abscissa refers to the load of the power consumption component, and an ordinate refers to the temperature of the power consumption component. Based on this, at block 602, the corresponding power consumption component temperature may be easily obtained based on the load determined at block 601 from the target DTS temperature curve corresponding to the current ambient temperature of the server.

Block 603: a difference between the determined power consumption component temperature and a preset shutdown temperature of the power consumption component is determined as a DTS temperature corresponding to the current load of the power consumption component.

In an example, the preset shutdown temperature of the power consumption component herein may be 100 degrees as shown in FIG. 2, and may also be another value, which is not specifically limited in the present disclosure.

Thus, the flow shown in FIG. 6 is completed. The DTS temperature corresponding to the current load of the power consumption component may be determined from the target DTS temperature curve through the flow shown in FIG. 6.

Figure 7:
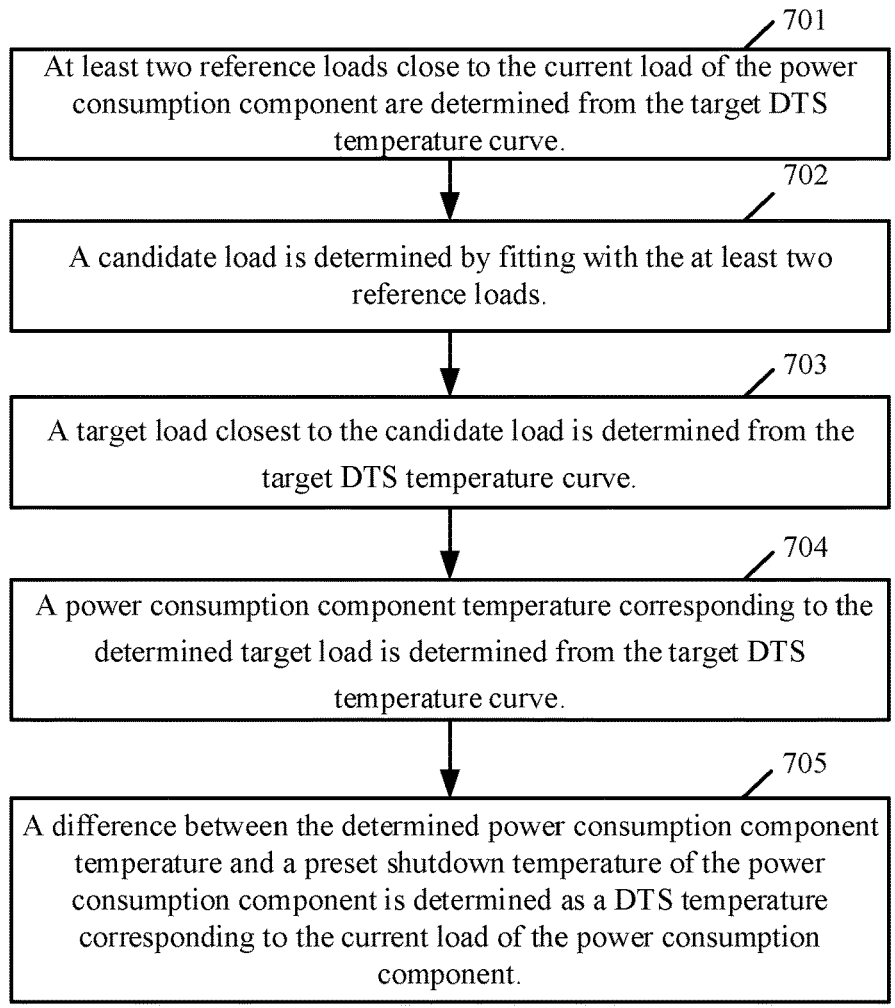
FIG. 7 is a schematic flowchart illustrating determining a DTS temperature corresponding to a current load of a power consumption component according to another example of the present disclosure.

FIG. 7 is a flowchart illustrating an implementation of block 302 according to another example of the present disclosure. As shown in FIG. 7, the flow may include the following blocks.

Block 701: at least two reference loads close to the current load of the power consumption component are obtained from the target DTS temperature curve corresponding to the current ambient temperature of the server.

Descriptions are made below by an example of obtaining two reference loads close to the current load of the power consumption component from the target DTS temperature curve. In an example, an obtained first reference load is exactly equal to the current load of the power consumption component, and a non-zero difference of an obtained second reference load with respect to the current load of the power consumption component is the smallest. For example, the second reference load may be either greater or smaller than the current load of the power consumption component, but the second reference load is closest to the current load of the power consumption component among all loads on the target DTS temperature curve.

In another example, the obtained first reference load is the smallest in all those load values greater than the current load of the power consumption component on the target DTS temperature curve, and the obtained second reference load is the biggest in all those load values smaller than the current load of the power consumption component on the target DTS temperature curve.

Block 702: a candidate load is obtained by fitting with the obtained at least two reference loads.

In an example of the present disclosure, a process of obtaining one candidate load by fitting with two reference loads may be implemented in a data fitting manner well known to those of ordinary skill in the art, which will not be described herein.

Block 703: a target load closest to the candidate load is determined from the target DTS temperature curve corresponding to the current ambient temperature of the server.

As described above, the DTS temperature curve indicates a corresponding relationship between the load of the power consumption component and the temperature of the power consumption component. An abscissa refers to the load of the power consumption component, and an ordinate refers to the temperature of the power consumption component. Based on this, at block 703, the target load closest to the candidate load obtained at block 702 may be easily determined from the target DTS temperature curve corresponding to the current ambient temperature of the server. If two closest target loads are determined, for example, one target load is greater than the candidate load obtained at block 702 and the other target load is smaller than the candidate load obtained at block 702, any one of two target loads may be selected.

Block 704: a power consumption component temperature corresponding to the determined target load is obtained from the target DTS temperature curve corresponding to the current ambient temperature of the server.

As described above, the DTS temperature curve indicates a corresponding relationship between the load of the power consumption component and the temperature of the power consumption component. An abscissa refers to the load of the power consumption component, and an ordinate refers to the temperature of the power consumption component. Based on this, at block 704, the corresponding power consumption component temperature corresponding to the target load determined at block 703 may be easily obtained from the target DTS temperature curve corresponding to the current ambient temperature of the server.

Block 705: a difference between the determined power consumption component temperature and a preset shutdown temperature of the power consumption component is determined as a DTS temperature corresponding to the current load of the power consumption component.

In an example, the preset shutdown temperature of the power consumption component herein may be 100 degrees as shown in FIG. 2, and may also be another value, which is not specifically limited in the present disclosure.

Thus, the flow shown in FIG. 7 is completed. The DTS temperature corresponding to the current load of the power consumption component may be determined from the target DTS temperature curve through the flow shown in FIG. 7.

FIG. 8 is a flowchart illustrating an implementation of block 304 according to an example of the present disclosure. As shown in FIG. 8, the flow may include the following blocks.

Block 801: a target speed of the fan is determined according to the current temperature of the power consumption component and the DTS temperature.

In an example, the target speed of the fan may be calculated by the following formula.

$$\text{Fan}i(k) = Kp \times E(k) + k(i)\Sigma_{i=0}^{k} E(i) + Kd \times \{E(k) - E(k-1)\}$$

$$E(k) = \text{Temp}(k) - \text{DTS}(\text{Load}(k), \text{InletTemp}(k))$$

Where, Fani(k) refers to a target speed of an i-th fan at a moment k; Kp, K(i), and Kd are proportional coefficients of a Proportion Integral Differential (PID) algorithm, respectively, and may be fixed values; Temp(k) refers to a current temperature of a power consumption component at the moment k; DTS(Load(k), InletTemp(k)) refers to a DTS temperature at the moment k; Load(k) refers to a current load of the power consumption component at the moment k; InletTemp(k) refers to a temperature of an air inlet at the moment k, i.e., an ambient temperature of a server.

Block 802: the speed of the fan associated with the power consumption component is correspondingly adjusted to the determined target speed.

Thus, the flow shown in FIG. 8 is completed.

Figure 9:
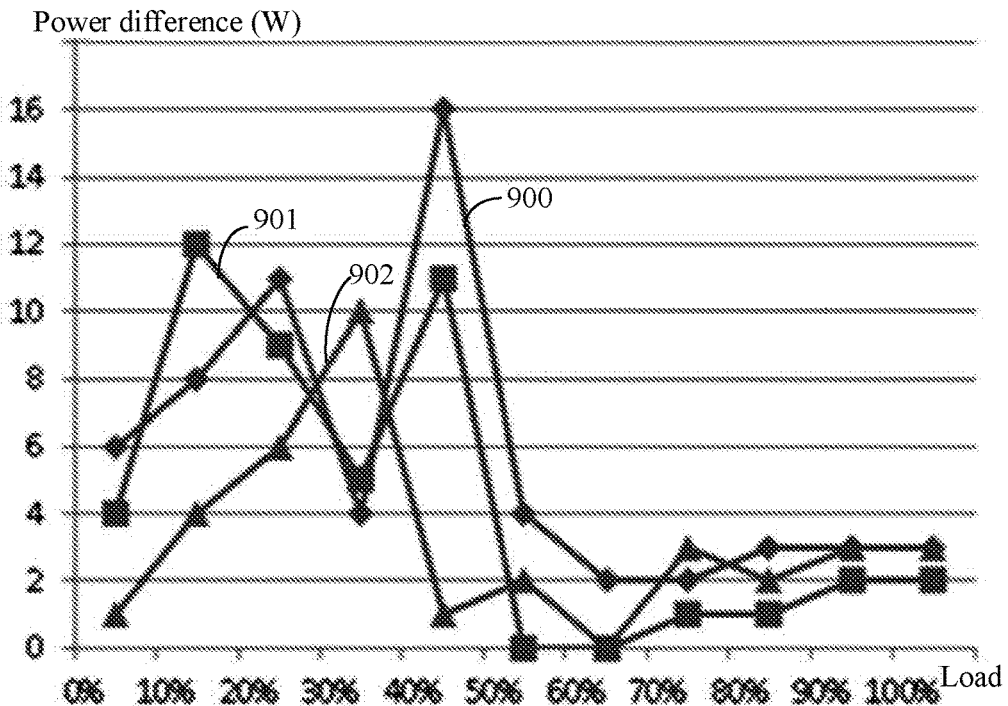
FIG. 9 is a schematic diagram illustrating a power consumption comparison curve according to an example of the present disclosure.

Based on the flows described above, the power consumption generated by a server when applying a method of controlling a fan speed according to an example of the present disclosure is compared with the power consumption generated by the server when applying a conventional method of controlling a fan speed based on a fixed curve. FIG. 9 illustrates a curve of a difference between the power consumption generated by the server when applying the method of the present disclosure and the power consumption generated by the server when applying the conventional method at different ambient temperatures. A curve 900 illustrates a difference of the power consumption when the ambient temperature is 20 degrees, a curve 901 illustrates a difference of the power consumption when the ambient temperature is 25 degrees, and a curve 902 illustrates a difference of the power consumption when the ambient temperature is 30 degrees. It may be seen that the difference of the power consumption generated by the server when applying the two methods is about 10 W on average in the case that the load carried by the power consumption component is lower than 50% of a full load, and the difference of the power consumption generated by the server when applying the two methods is about 3 W on average in the case that the load carried by the power consumption component is greater than 50% of the full load. Based on an assumption of power consumption of 300 W required for normal operation of a server, at least 3% of the power consumption can be reduced by the method of the present disclosure compared with the conventional method.

Thus, the description of the method of the present disclosure is completed. A device of the present disclosure will be described below.

Figure 10:
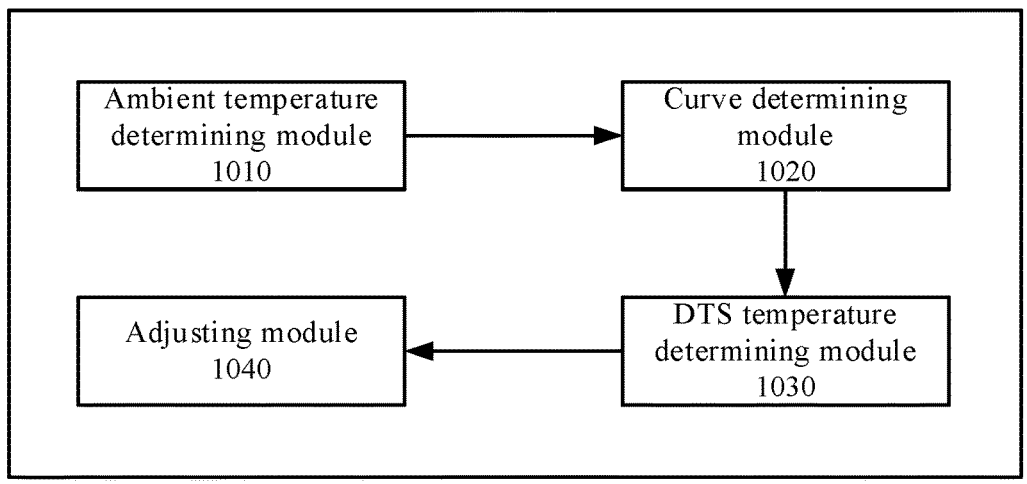
FIG. 10 is a schematic diagram illustrating a structure of a device according to an example of the present disclosure.

FIG. 10 is a schematic diagram illustrating a structure of a device according to an example of the present disclosure. As shown in FIG. 10, the device may include:

an ambient temperature determining module 1010, configured to determine a current ambient temperature of a server;

a curve determining module 1020, configured to determine a target DTS temperature curve corresponding to the current ambient temperature of the server;

a DTS temperature determining module 1030, configured to determine a DTS temperature corresponding to a current load of a power consumption component in the server from the target DTS temperature curve corresponding to the current ambient temperature of the server; and an adjusting module 1040, configured to adjust a speed of a fan associated with the power consumption component according to the DTS temperature and a current temperature of the power consumption component.

In an example, the curve determining module 1020 determines the target DTS temperature curve corresponding to the current ambient temperature of the server from a plurality of stored DTS temperature curves specifically includes: selecting one or two candidate DTS temperature curves from the plurality of stored DTS temperature curves, where each of the candidate DTS temperature curves corresponds to an ambient temperature which is closest to the current ambient temperature of the server; and determining any one of the candidate DTS temperature curves as the target DTS temperature curve corresponding to the current ambient temperature of the server.

Alternatively, the curve determining module 1020 may select at least two reference DTS temperature curves from the plurality of stored DTS temperature curves, where each of the reference DTS temperature curves corresponds to an ambient temperature which is close to the current ambient temperature of the server; and determine the target DTS temperature curve corresponding to the current ambient temperature of the server by fitting with the at least two reference DTS temperature curves.

In an example, the DTS temperature curve is used to indicate a relationship between a load of a power consumption component and a temperature of the power consumption component. Based on this, the DTS temperature determining module 1030 may be configured to: determine a target load closest to a current load of the power consumption component from the target DTS temperature curve corresponding to the current ambient temperature of the server; determine a power consumption component temperature corresponding to the determined target load from the target DTS temperature curve corresponding to the current ambient temperature of the server; and determine a difference between the determined power consumption component temperature and a preset shutdown temperature of the power consumption component as a DTS temperature corresponding to the current load of the power consumption component.

Alternatively, the DTS temperature determining module 1030 may be configured to: select at least two reference loads close to the current load of the power consumption component from the target DTS temperature curve corresponding to the current ambient temperature of the server; obtain a candidate load by fitting with the at least two reference loads; determine a target load closest to the candidate load from the target DTS temperature curve corresponding to the current ambient temperature of the server; determine a power consumption component temperature corresponding to the determined target load from the target DTS temperature curve corresponding to the current ambient temperature of the server; and determine a difference between the determined power consumption component temperature and the preset shutdown temperature of the power consumption component as a DTS temperature corresponding to the current load of the power consumption component.

In an example, the adjusting module 1040 may be configured to: determine a target speed according to the current temperature of the power consumption component and the DTS temperature; and adjust a speed of the fan associated with the power consumption component to the determined target speed.

Thus, the description of the structure of the device shown in FIG. 10 is completed.

Figure 11:
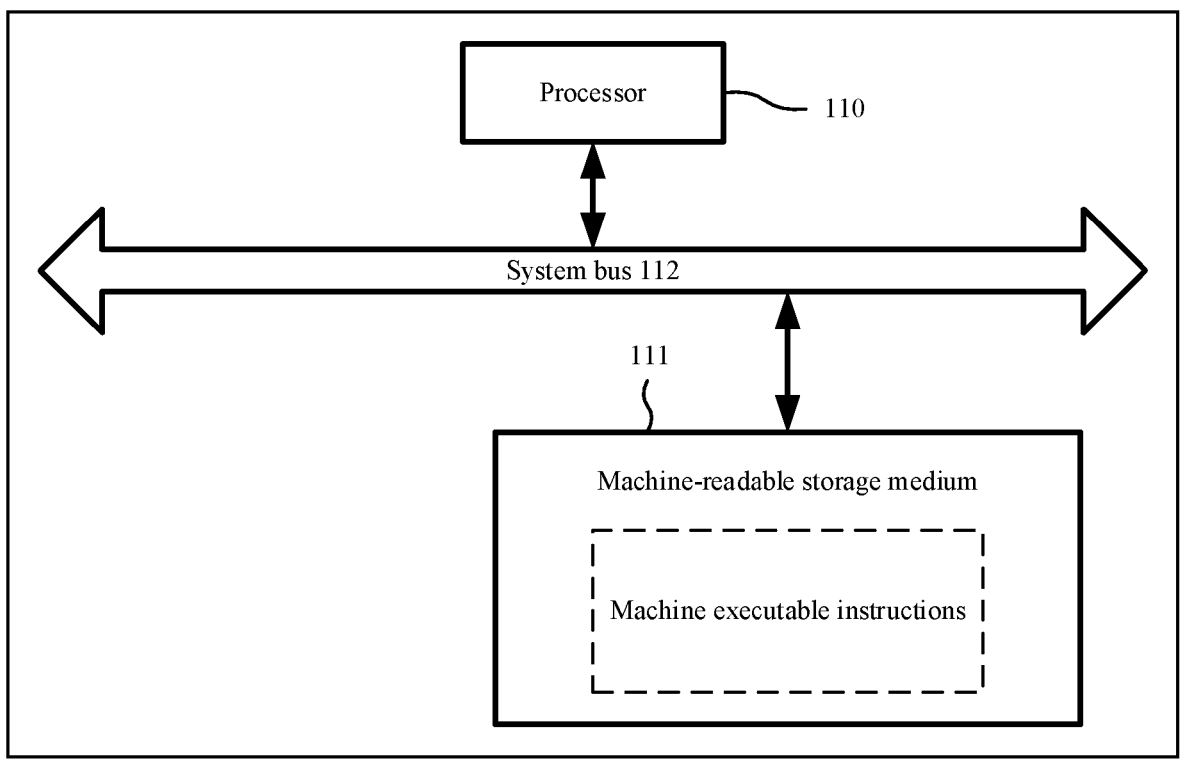
FIG. 11 is a schematic diagram illustrating a hardware structure of a device according to an example of the present disclosure.

FIG. 11 is a schematic diagram illustrating a hardware structure of a device for controlling a fan speed according to an example of the present disclosure. The device for controlling a fan speed may include a processor 110 and a machine-readable storage medium 111 storing machine-executable instructions. The processor 110 and the machine-readable storage medium 111 may communicate with each other via a system bus 112. The machine-readable storage medium 111 stores machine-executable instructions executable by the processor 110. The processor 110 may implement the above method of controlling a fan speed by reading and executing the machine-executable instructions stored in the machine-readable storage medium 111.

Thus, the description of the hardware structure shown in FIG. 11 is completed.

The present disclosure also provides a machine-readable storage medium including machine-executable instructions, for example, the machine-readable storage medium 111 in FIG. 11 storing machine-executable instructions. When the machine-executable instructions are invoked and executed by a processor, the processor 110 shown in FIG. 11 is caused by the machine-executable instructions to implement the method of controlling a fan speed.

The machine-readable storage medium 111 mentioned herein may be any of electronic, magnetic, optical or other physical storage devices and may contain or store information such as executable instructions, data and so on. For example, the machine-readable storage medium 111 may be a volatile memory, a non-volatile memory or a similar storage medium. Specifically, the machine-readable storage medium 111 may be a Radom Access Memory (RAM), a flash memory, a storage drive, a solid state hard disk, any type of storage disk, or a similar storage medium, or a combination thereof.

It shall be noted in the present disclosure that the term "including", "comprising" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The foregoing disclosure is merely illustrative of preferred examples of the present disclosure but not intended to limit the present disclosure, and any modifications, equivalent substitutions, adaptations thereof made within the spirit and principles of the disclosure shall be encompassed in the scope of protection of the present disclosure.

The invention claimed is:

1. A method of controlling a fan speed, comprising:
   determining a current ambient temperature of a server;
   determining a target digital temperature sensor (DTS) temperature curve corresponding to the current ambient temperature of the server;
   determining a DTS temperature corresponding to a current load of a power consumption component in the server according to the target DTS temperature curve; and
   adjusting a speed of a fan associated with the power consumption component according to the DTS temperature and a current temperature of the power consumption component.

2. The method according to claim 1, wherein determining the current ambient temperature of the server comprises:
   acquiring a temperature collected by a temperature sensor provided at an air inlet of the server, and
   taking the temperature collected by the temperature sensor as the ambient temperature.

3. The method according to claim 1, wherein determining the target DTS temperature curve corresponding to the current ambient temperature of the server comprises:
   selecting one or two candidate DTS temperature curves from a plurality of stored DTS temperature curves, wherein each of the candidate DTS temperature curves corresponds to an ambient temperature closest to the current ambient temperature of the server; and
   determining one of the candidate DTS temperature curves as the target DTS temperature curve.

4. The method according to claim 1, wherein determining the target DTS temperature curve corresponding to the current ambient temperature of the server comprises:
   selecting at least two DTS reference temperature curves from a plurality of stored DTS temperature curves, wherein each of the reference DTS temperature curves corresponds to an ambient temperature which is close to the current ambient temperature of the server; and
   determining the target DTS temperature curve by fitting with the at least two reference DTS temperature curves.

5. The method according to claim 1, wherein determining the DTS temperature corresponding to the current load of the power consumption component in the server according to the target DTS temperature curve comprises:
   determining a target load which is closest to the current load of the power consumption component from the target DTS temperature curve;
   determining a power consumption component temperature corresponding to the determined target load from the target DTS temperature curve; and
   determining a difference between the determined power consumption component temperature and a preset shutdown temperature of the power consumption component as the DTS temperature corresponding to the current load of the power consumption component.

6. The method according to claim 1, wherein determining the DTS temperature corresponding to the current load of the power consumption component in the server according to the target DTS temperature curve comprises:
   selecting at least two reference loads which are close to the current load of the power consumption component from the target DTS temperature curve;
   determining a candidate load by fitting with the at least two reference loads;
   determining a target load closest to the candidate load from the target DTS temperature curve;
   determining a power consumption component temperature corresponding to the determined target load from the target DTS temperature curve; and
   determining a difference between the determined power consumption component temperature and a preset shutdown temperature of the power consumption component as the DTS temperature corresponding to the current load of the power consumption component.

7. The method according to claim 1, wherein adjusting the speed of the fan associated with the power consumption component according to the DTS temperature and the current temperature of the power consumption component comprises:
   determining a target speed according to the current temperature of the power consumption component and the DTS temperature; and
   adjusting the speed of the fan associated with the power consumption component to the determined target speed.

8. A device for controlling a fan speed, comprising:
   a processor; and
   a machine-readable storage medium storing machine-executable instructions executable by the processor, wherein the machine-executable instructions cause the processor to:
   determine a current ambient temperature of a server;
   determine a target DTS temperature curve corresponding to the current ambient temperature of the server;

determine a DTS temperature corresponding to a current load of a power consumption component in the server according to the target DTS temperature curve; and adjust a speed of a fan associated with the power consumption component according to the DTS temperature and a current temperature of the power consumption component.

9. The device according to claim 8, wherein when determining the current ambient temperature of the server, the processor is caused to:

acquire a temperature collected by a temperature sensor provided at an air inlet of the server, and take the temperature collected by the temperature sensor as the ambient temperature.

10. The device according to claim 8, wherein when determining the target DTS temperature curve corresponding to the current ambient temperature of the server, the processor is caused to:

select one or two candidate DTS temperature curves from a plurality of stored DTS temperature curves, wherein each of the candidate DTS temperature curves corresponds to an ambient temperature closest to the current ambient temperature of the server; and determine one of the candidate DTS temperature curves as the target DTS temperature curve.

11. The device according to claim 8, wherein when determining the target DTS temperature curve corresponding to the current ambient temperature of the server, the processor is caused to:

select at least two DTS reference temperature curves from a plurality of stored DTS temperature curves, wherein each of the reference DTS temperature curves corresponds to an ambient temperature which is close to the current ambient temperature of the server; and determine the target DTS temperature curve by fitting with the at least two reference DTS temperature curves.

12. The device according to claim 8, wherein when determining the DTS temperature corresponding to the current load of the power consumption component in the server according to the target DTS temperature curve, the processor is caused to:

determine a target load which is closest to the current load of the power consumption component from the target DTS temperature curve;

determine a power consumption component temperature corresponding to the determined target load from the target DTS temperature curve; and determine a difference between the determined power consumption component temperature and a preset shutdown temperature of the power consumption component as the DTS temperature corresponding to the current load of the power consumption component.

13. The device according to claim 8, wherein when determining the DTS temperature corresponding to the current load of the power consumption component in the server according to the target DTS temperature curve, the processor is caused to:

select at least two reference loads which are close to the current load of the power consumption component from the target DTS temperature curve;

determine a candidate load by fitting with the at least two reference loads;

determine a target load closest to the candidate load from the target DTS temperature curve;

determine a power consumption component temperature corresponding to the determined target load from the target DTS temperature curve; and determine a difference between the determined power consumption component temperature and a preset shutdown temperature of the power consumption component as the DTS temperature corresponding to the current load of the power consumption component.

14. The device according to claim 8, wherein when adjusting the speed of the fan associated with the power consumption component according to the DTS temperature and the current temperature of the power consumption component, the processor is caused to:

determine a target speed according to the current temperature of the power consumption component and the DTS temperature; and adjust the speed of the fan associated with the power consumption component to the determined target speed.

15. A machine-readable storage medium storing machine executable instructions, wherein, a processor is caused by invoking and executing the machine-executable instructions to:

determine a current ambient temperature of a server;

determine a target DTS temperature curve corresponding to the current ambient temperature of the server;

determine a DTS temperature corresponding to a current load of a power consumption component in the server according to the target DTS temperature curve; and adjust a speed of a fan associated with the power consumption component according to the DTS temperature and a current temperature of the power consumption component.

16. The storage medium according to claim 15, wherein when determining the target DTS temperature curve corresponding to the current ambient temperature of the server, the processor is caused to:

select one or two candidate DTS temperature curves from a plurality of stored DTS temperature curves, wherein each of the candidate DTS temperature curves corresponds to an ambient temperature closest to the current ambient temperature of the server; and determine one of the candidate DTS temperature curves as the target DTS temperature curve.

17. The storage medium according to claim 15, wherein when determining the target DTS temperature curve corresponding to the current ambient temperature of the server, the processor is caused to:

select at least two DTS reference temperature curves from a plurality of stored DTS temperature curves, wherein each of the reference DTS temperature curves corresponds to an ambient temperature which is close to the current ambient temperature of the server; and determine the target DTS temperature curve by fitting with the at least two reference DTS temperature curves.

18. The storage medium according to claim 15, wherein when determining the DTS temperature corresponding to the current load of the power consumption component in the server according to the target DTS temperature curve, the processor is caused to:

determine a target load which is closest to the current load of the power consumption component from the target DTS temperature curve;

determine a power consumption component temperature corresponding to the determined target load from the target DTS temperature curve; and determine a difference between the determined power consumption component temperature and a preset shutdown temperature of the power consumption component as the DTS temperature corresponding to the current load of the power consumption component.

19. The storage medium according to claim 15, wherein when determining the DTS temperature corresponding to the current load of the power consumption component in the server according to the target DTS temperature curve, the processor is caused to:
- select at least two reference loads which are close to the current load of the power consumption component from the target DTS temperature curve;
- determine a candidate load by fitting with the at least two reference loads;
- determine a target load closest to the candidate load from the target DTS temperature curve;
- determine a power consumption component temperature corresponding to the determined target load from the target DTS temperature curve; and
- determine a difference between the determined power consumption component temperature and a preset shutdown temperature of the power consumption component as the DTS temperature corresponding to the current load of the power consumption component.

20. The storage medium according to claim 15, wherein when adjusting the speed of the fan associated with the power consumption component according to the DTS temperature and the current temperature of the power consumption component, the processor is caused to:
- determine a target speed according to the current temperature of the power consumption component and the DTS temperature; and
- adjust the speed of the fan associated with the power consumption component to the determined target speed.

* * * * *